May 5, 1925.
B. M. DENHAM
1,536,778
MEANS FOR MOUNTING VEHICLE WHEELS
Filed Feb. 14, 1924
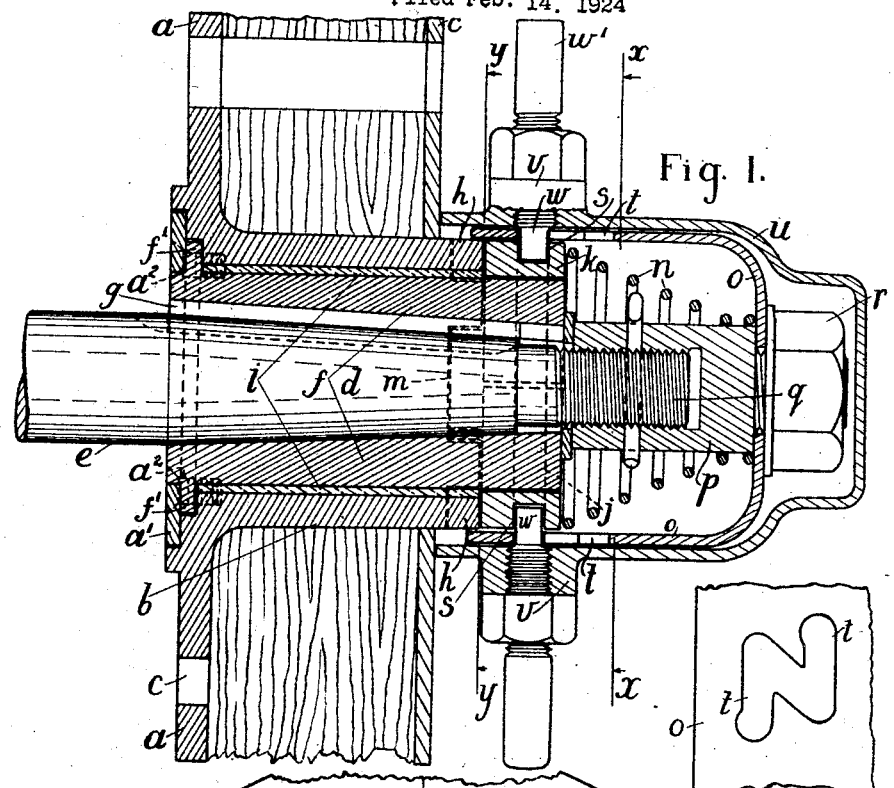
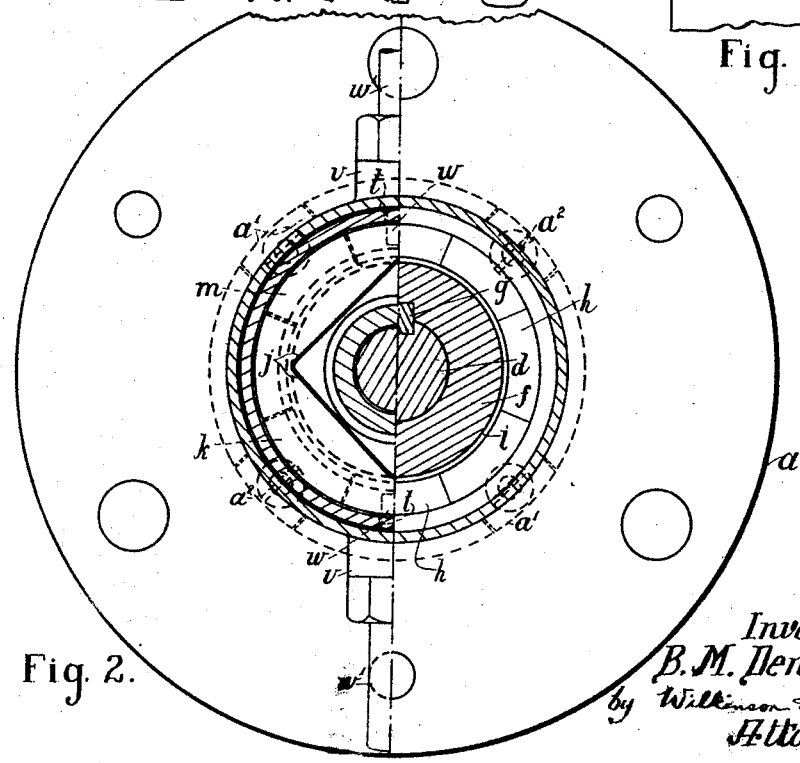
Inventor
B. M. Denham
by Wilkinson & Giusta
Attorneys.

Patented May 5, 1925.

1,536,778

UNITED STATES PATENT OFFICE.

BERTRAM METCALF DENHAM, OF LEEDS, ENGLAND.

MEANS FOR MOUNTING VEHICLE WHEELS.

Application filed February 14, 1924. Serial No. 692,851.

*To all whom it may concern:*

Be it known that I, BERTRAM METCALF DENHAM, subject of the King of Great Britain, and resident of Leeds, England, have invented certain new and useful Improvements in Means for Mounting Vehicle Wheels, of which the following is a specification.

It is common with motorists to experience considerable difficulty in starting automobile engines of the type wherein a direct drive is provided between the engine and the rear axle with the ordinary differential gear interposed, particularly when the engine is in a cold state and when the clutch is bound by the adhesive effect of oil for example, so that the engine cannot be deprived of its load in which event the lifting of one of the rear wheels off the ground is frequently resorted to in order to start the engine.

The object of the present invention is to facilitate the starting of automobile engines under such adverse circumstances and for this purpose one of the rear road wheels is mounted in such a manner that what is known as a free wheel action is permissible of the rear axle by the disengagement of clutch gear which is employed in connection with one of the road wheels normally to secure the said road wheel to the axle, thus obviating the necessity of lifting the said road wheel off the ground.

A constructional form of mounting one of the rear road wheels of an automobile in accordance with this invention is illustrated in the accompanying drawing to which reference may now be had in the following detailed description of the device in which similar reference characters relate to like parts in all the figures.

Figure 1 is a longitudinal sectional elevation of the device applied to the ordinary standard axle of a "Ford" car.

Figure 2 on the left hand side of the centre line is a sectional end view taken on line *x*—*x* of Figure 1 whilst on the right hand side of the centre line is a similar view taken on line *y*—*y* both instances as viewed from the right hand of Figure 1 and Figure 3 a fragmentary detail view.

Referring now to the drawing instead of the hub flange *a* carrying the boss *b* on which the road wheel *c* is mounted being secured to the tapered end *d* of the axle *e* it is loosely and rotatably mounted on the sleeve *f* that is secured to the tapered end *d* of the axle *e* by the key *g* or in any other convenient manner.

The end of the boss *b* is formed with projections *h* that constitute one half of a claw or dog clutch, is provided with a gun-metal bush *i* and is rotatable about the sleeve *f*. The forward end *j* of the sleeve *f* is of square or other suitable section and slidably mounted thereon is a collar *k* that constitutes the second half of the claw or dog clutch the projections *m* of which enter the recesses adjacent to the projections *h* on the end of the boss *b* so that when in engagement as shown in Figure 1 the wheel *c* rotates with the axle *e*.

The collar *k* is pressed forward towards the end of the boss *b* by the spring *n* contained within the cup *o* that encloses the halves of the claw or dog clutch. This cup *o* is provided with the internal screw socket *p* that is screwed on to the ordinary standard screw-threaded end *q* of the axle *e* and is maintained in its position as shown in Figure 1 by the nut *r*. Coincident with the annular groove *s* in the collar *k* is provided in the cup *o* slots *t* of more or less Z-shape as clearly seen in the fragmentary view of the cup *o* illustrated in Figure 3. These slots enable specific movements to be imparted to the collar *k* as hereinafter described whereby the movable half of the claw or dog clutch can be disengaged and engaged at will.

The cup *o* together with its securing nut *r* is wholly enclosed to exclude dust and dirt by the cap *u* which in the example shown is provided with a pair of bosses *v* into which are fixed operating pins *w* that pass through the slots *t* into the annular groove *s* of the collar *k*. The outer ends *w'* of the pins *w* serve the purpose of effecting the disengagement of the clutch coupling as will be readily understood.

In the example illustrated as already referred to the device is shown applied to the ordinary standard "Ford" car axle and the sleeve *f* is provided with a collar *f'* that rotates in a recess formed in the hub plate *a* the keeper or star plate *a'* secured to the hub plate *a* by the screws *a²* serving to retain the sleeve *f* in position within the boss *b*.

It will now be understod that in the event of difficulty in starting the engine as aforesaid it will only be necessary to withdraw the claws *m* from engagement with the claws *h* on the boss *b* by taking hold of the operating pins *w'* drawing the cap *u* outwardly rotating same to the right or clockwise as viewed in Figure 2 so that the pins *w* travel in the slots *t* and withdraw the collar *k* against the pressure of the spring *n* the disengagement being assured by the pins *w* resting in the opposite ends of the slots *t* and the engine can be then readily started as no drag will be imparted to the axle *e* by the road wheel *c*; the bound clutch can then be released and the inverse action of the operating pins *w'* will put all in order for running.

What I claim is:

The combination with a vehicle wheel, a hub thereof provided with clutch teeth and an axle therefor with a tapered end, a sleeve fixed to said tapered end and rotatably carrying said wheel hub, and a collar slidably mounted on said sleeve and provided with clutch teeth for engaging the clutch teeth on said wheel hub of means for effecting the engagement and disengagement of said clutch elements comprising an inner cap screwed upon the end of said axle and provided with slots, a spring within said cap bearing against said slidable collar and an outer cap enclosing said inner cap and carrying pins for operating said clutch elements; said pins operatively engaging with said collar and passing to the exterior through the slots in said inner cap.

In testimony whereof I affix my signature.

BERTRAM METCALF DENHAM.